United States Patent
Nizami et al.

(10) Patent No.: US 9,489,459 B2
(45) Date of Patent: Nov. 8, 2016

(54) SINGLE POINT METADATA DRIVEN SEARCH CONFIGURATION, INDEXING AND EXECUTION

(71) Applicants: Javeed Nizami, Plano, TX (US); Arvind Parasuram, Arlington, TX (US)

(72) Inventors: Javeed Nizami, Plano, TX (US); Arvind Parasuram, Arlington, TX (US)

(73) Assignee: SIEMENS PRODUCT LIFECYCLE MANAGEMENT SOFTWARE INC., Plano, TX (US)

(*) Notice: Subject to any disclaimer, the term of this patent is extended or adjusted under 35 U.S.C. 154(b) by 249 days.

(21) Appl. No.: 14/033,959

(22) Filed: Sep. 23, 2013

(65) Prior Publication Data

US 2014/0358892 A1  Dec. 4, 2014

Related U.S. Application Data

(60) Provisional application No. 61/828,342, filed on May 29, 2013, provisional application No. 61/828,339, filed on May 29, 2013.

(51) Int. Cl.
*G06F 17/30* (2006.01)

(52) U.S. Cl.
CPC ... *G06F 17/30864* (2013.01); *G06F 17/30292* (2013.01); *G06F 17/30336* (2013.01); *G06F 17/30392* (2013.01)

(58) Field of Classification Search
None
See application file for complete search history.

(56) References Cited

U.S. PATENT DOCUMENTS

| | | | |
|---|---|---|---|
| 2003/0177481 A1* | 9/2003 | Amaru et al. | 717/148 |
| 2004/0225680 A1* | 11/2004 | Cameron et al. | 707/104.1 |
| 2009/0024650 A1* | 1/2009 | Kamani et al. | 707/102 |
| 2010/0049729 A1* | 2/2010 | Black | G06F 17/3092 707/803 |
| 2014/0129543 A1* | 5/2014 | Solheim | 707/711 |

\* cited by examiner

*Primary Examiner* — Alex Gofman
*Assistant Examiner* — Umar Mian

(57) ABSTRACT

Systems and methods for application search configuration, indexing, and execution. A method includes receiving a metadata definition for search and indexing configuration and generating a transfer mode definition to export objects for indexing. The method includes identifying objects to be indexed according to the metadata definition and extracting data according to the transfer mode definition. The method includes indexing the extracted data. The method can include executing queries according to the meta definition.

16 Claims, 3 Drawing Sheets

SINGLE POINT METADATA DRIVEN SEARCH CONFIGURATION, INDEXING AND EXECUTION

CROSS-REFERENCE TO RELATED APPLICATIONS

This application claims the benefit of the filing date of U.S. Provisional Patent Applications 61/828,342 and 61/828,339, both filed May 29, 2013, which are hereby incorporated by reference. This application also has some subject matter in common with concurrently filed U.S. patent application Ser. No. 14/034,063 filed Sep. 23, 2013 for "Rules-Based Knowledge-Driven Search Filters," which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include systems and methods for single-point metadata driven "code-less" automation of application search configuration, indexing, and execution. A method includes receiving a metadata definition for search and indexing, configuration and generating a transfer mode definition to export objects for indexing. The method includes identifying objects to be indexed according to the metadata definition and extracting data according to the transfer mode definition. The method includes indexing the extracted data and can include executing queries.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
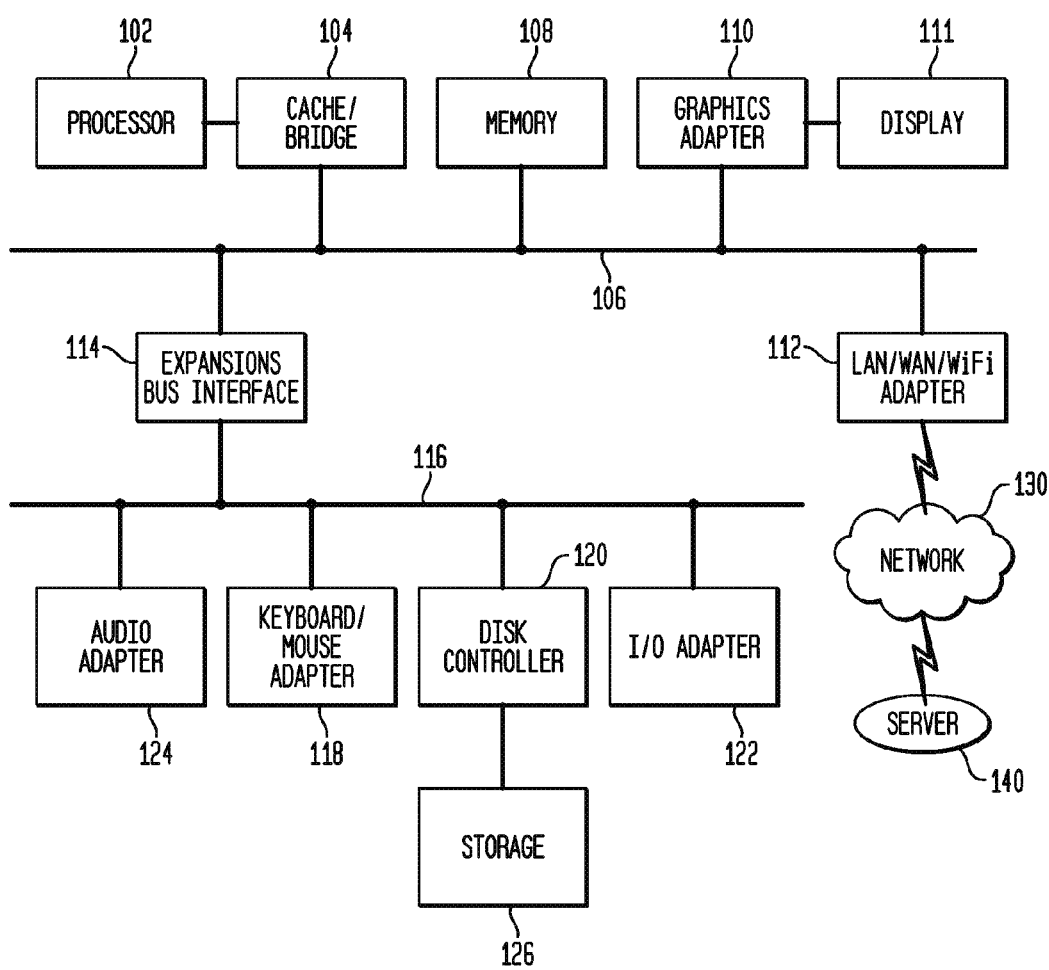
FIG. 1 depicts a block diagram of a data processing system in which an embodiment can be implemented.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Users expect simplicity and accuracy when searching for data in any application. Enterprise applications, however, are traditionally built on relational databases and the user interaction with these databases requires the user to understand the data model, which makes it cumbersome and difficult to use. To address this need, applications integrate with search engines that index the application data to allow for the expected user experience.

Search engine integrations of enterprise applications have historically been an expensive exercise, and in many cases, the integrations require specific coding to address the needs of an industry or customer. Such integrations are expensive to build, deploy and maintain. Furthermore, solutions did not have enough configurability to allow changes to be made as business requirements evolved, which leads to delays in deploying an enhanced solution.

Indexing application data for search purposes is a non-trivial task as applications can generate terabytes of data which needs to be indexed. Application data models and search engine data models typically tend to be disparate entities. The mapping required in aligning data between applications and search engines can be complex, requiring mappings to be redefined each time the data model changes or different search engines are used.

An indexing process can include, among other processes, identifying the data that needs to be indexed, identifying the properties on objects that the end user can query and filter on, exporting the application data to index into the search engine, converting the exported application data into a specific search engine data model format, and uploading the converted data into the search engine.

At runtime, when a search is performed, the search process can include, among other processes, parsing the user query and translating it to the format the search engine understands, enhancing the query to request facet information (counts etc.) for the properties that the system wants to offer faceting on, executing the search, and returning the matches found and the facet information based on the priority and other criteria that decide the order in which the facets are presented to the user. Facets provide aggregated data based on a search query. Facets correspond to properties of the data being searched, and can be derived by analysis of the text or contents of an item using entity extraction techniques or from pre-existing fields in a database such as author, descriptor, language, and format, or other fields specific to the type of data. Thus, existing web-pages, product descriptions or online collections of articles can be augmented with navigational facets.

The indexing code has knowledge about the types of objects that can be queried for among various object types. When an end-user performs searches, the searches can be across all properties or on specific properties of objects. Users can also filter the results based on property values. This knowledge, about which object properties can be searched on or filtered on, can be integrated into the indexing code. Similarly, to be able to export application data for indexing, the indexing code is able to only export those properties on objects that will actually be indexed. Otherwise, exporting all of an object's data may have an impact on performance. Finally, the exported application data can be mapped to a format that a search engine can recognize and handle.

Until now, enterprise systems, even those that have metadata driven architectures, required manual coding and/or manual configuration in addition to metadata for integrating with search engines. In some systems, the business logic needed to perform these steps is embedded in code by the application developer and makes assumptions about various aspects of the data model, properties, mappings etc. This means that when the search requirements change due to business needs or data model changes or when the need arises to use a different search engine, the code has to be modified to accommodate these changes. This increases the cost of maintaining the solutions and slows down the deployment of improvements as the business learns better ways to model data and present data to their users.

This is a problem for in-house search solutions that businesses develop. For commercial products that are deployed by many customers across different industries, the cost of deployment and ownership grows as these products will need to be customized by writing code for each customer based on their needs. Since the business logic is embedded in code, anytime a different set of objects has to be indexed or the customer wants additional properties to be indexed, there are costs associated with the change. The "code" solution makes it inflexible as different customers will have different requirements when it comes to the data they want to index. Either the original source code of the application has to be changed, which could impact all customers or customers have to develop a customized indexing solution specific to their company's needs. In either case, customers have to wait till a newer version of the indexing solution is deployed, which could take a while in a large production environment. So, there are not only costs associated with change, but the change itself is time dependent and not instantaneous.

Systems and methods disclosed herein provide a single-point metadata driven "code-less" approach to automating the indexing process. This innovative approach allows an administrator of an application to define, prior to deployment and in one place, the object types and the properties on those object types that are relevant to indexing.

This pre-defined metadata can then be leveraged to auto-generate any or all of the following "artifacts" during deployment:

The configuration needed to query instances of the object types to be indexed;
The property sets that determine which properties on what objects are to be exported when application data is exported;
The schema for the exported application data;
The search engine specific schema files that correlate to the exported application data; and
The transformer configuration needed to convert the exported application data into specific search engine formats.

Using disclosed techniques, when new object types are added or new properties are added and data pertaining to it needs to be indexed, the user or operator is not required to write or modify any code. The administrator merely has to configure and re-deploy the indexing metadata, and during deployment, any or all of the artifacts listed above is auto-generated by the system. The entire configurability of the indexing process rests in the hands of the application administrator. This is a huge productivity improvement and savings for the customer.

The auto-generated artifacts are used by the indexing process and the search component. Thus, a single metadata definition is used to define, index, and execute a search in a completely "code-less" manner, as described in detail below, that provides such a metadata driven end-to-end solution to configure and execute searches in an application.

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

In the Teamcenter® software products by Siemens Product Lifecycle Management Software Inc., the data model is defined using the Business Modeler Integrated Development Environment (BMIDE). The metadata, which can include the object type definition and properties, is stored in BMIDE templates. Other systems use other specific approaches, and disclosed techniques can be used to create and manage metadata as described herein as adapted for those systems. For consistent reference, these will be referred to as a business modeler (BM) and BM templates, and are not intended to refer to the Siemens Product Lifecycle Management Software Inc. software in particular.

To implement the single-point metadata driven "code-less" approach in specific embodiments, the BM is used to define additional metadata that is necessary to index, search, and filter application data. Each object that needs to be indexed can be tagged with a Business Object constant. Each property that needs to be indexed is tagged with property constants, which help determine if the property is indexed, whether it can be filtered on, whether the values for the property need to be cached in the search engine, and whether there is any additional information required or provided when handling reference-based properties, etc.

The above configuration is persisted in BM templates and allows the administrator to override the configuration that is provided out-of-the-box or define new configurations for custom object types and properties. This allows for a single point of definition using BMIDE templates that can then be used to effortlessly auto-generate the artifacts needed for indexing the application data in a "code-less" manner during deployment.

Figure 2:
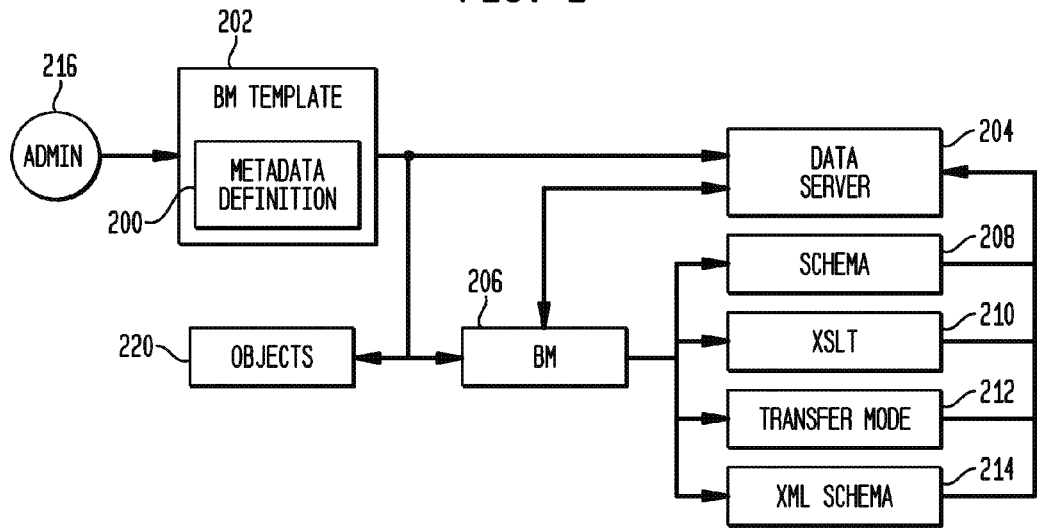
FIG. 2 illustrates metadata definition and model processing for an exemplary embodiment.

FIG. 2 illustrates metadata definition and model processing for an exemplary embodiment that can be implemented, for example, using Teamcenter® data and the Solr search engine. Solr refers to the Solr open-source search server, but the principles described herein can be applied to other search engines and systems, which are referred to generically as a "search server" below. A data server, as used herein, can be implemented by a Teamcenter® server or other server that performs processes as described.

Note that any of the systems described herein can be implemented as a separate data processing system 100, or the functions of multiple systems may be performed by the system physical system.

The following description is one example of how a metadata definition, such as a BM metadata definition 200 in a BM template 202, can be used to configure, index, and execute searches in accordance with disclosed embodiments.

An administrator 216 or other user identifies the Business Objects and properties on Business Objects to be indexed to build a BM template 202, such as objects 220. Objects 220 can each have related properties or parameters. The administrator 216 deploys the BM template 202, which is transmitted to and received by both the BM 206 and a data server 204. As part of the deployment process, the BM 206 extracts the data model and auto-generates several artifacts. These include a search server schema file 208, an XSLT file 210, the transfer mode definition 212, and the XML schema 214, each of which is uploaded and stored in the data server 204. Of course, XSLT and XML are examples of suitable files and languages, but other languages could be used.

The search server schema file 208 can identify properties that need to be in the index, identify the definition source for properties, identify properties on referenced objects that need to be in the index, and contain field definitions in the search server format for data server business objects and properties that need to be indexed.

The XSLT file 210 maps the data server XML data to a search-server-schema-compliant data format. In most cases, only object types and properties marked for indexing are mapped. Auto-generation of the XSLT file 210 by the BM 206 saves time, reduces errors, and eliminates the need to understand XSL, which is particularly advantageous since XSL knowledge generally tends to be limited.

The transfer mode definition 212 can contain the closure rules and property sets required to export data server business objects and their properties, such as objects 220. Auto-generation of the transfer mode definition by the BM 206 saves significant effort as hand-crafting these is error prone and costly. The transfer mode definition 212 defines which objects, what properties on those objects, which relations to traverse under what conditions, and which objects should be only traversed and which should be traversed and exported. The closure rules can function as the definition of the group of objects that need to be traversed and exported, while the property sets define what properties are to be exported once an object is selected for exporting.

The data server XML schema 214 validates that the exported data complies with the server schema prior to indexing.

Figure 3:
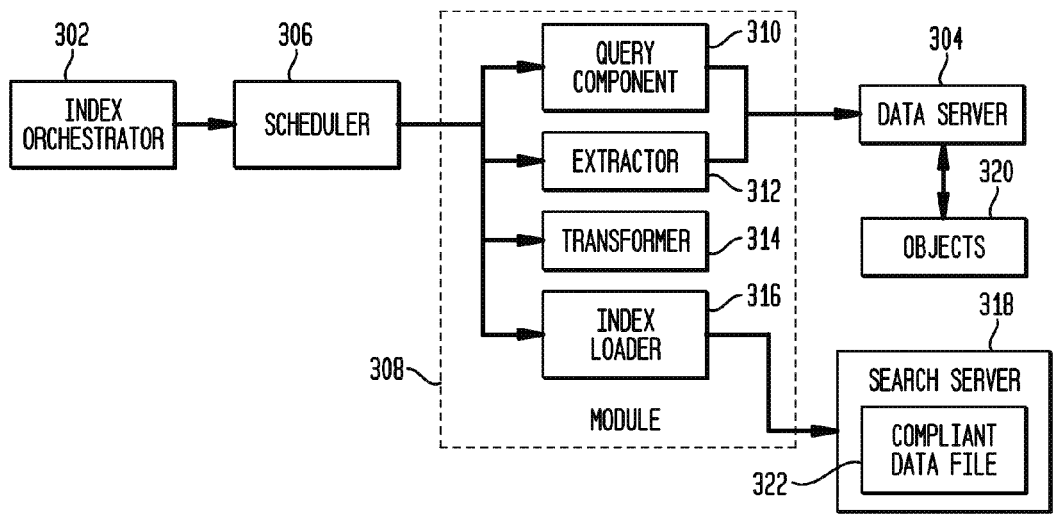
FIG. 3 illustrates an exemplary indexing process in accordance with disclosed embodiments.

FIG. 3 illustrates an exemplary indexing process in accordance with disclosed embodiments.

During the indexing process, the index orchestrator 302 can perform several processes, which can be scheduled by or via a scheduler 306 in some embodiments. In other embodiments, no scheduler 306 is used. These processes can be performed, for example, by one or more software modules 308 that have various components as described below.

The index orchestrator 302 can use a query component 310 to query data server 304 for objects 320 that need to be indexed based on the metadata definition in the BM template. The index orchestrator 302 can use an extractor 312 to extract the application data from data server 304 using the auto-generated transfer mode. The extracted data can correspond to one or more of the objects 320, and can include object contents, properties, parameters, or other data.

The index orchestrator 302 can use a transformer 314 to transform the extracted data into an appropriate format for search server 318 using the auto-generated XSLT file and search server schema file; the result is a search-server-schema-compliant data file 322. The index orchestrator 302 can use an index loader 316 to load the search-server-schema-compliant data file 322 into the search server 318 for indexing. The search server 318 indexes the loaded data.

Figure 4:
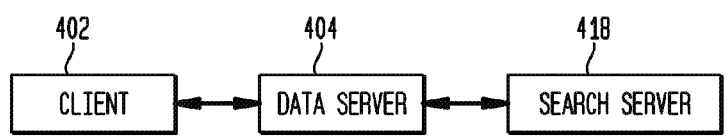
FIG. 4 illustrates an exemplary query execution process in accordance with disclosed embodiments.

FIG. 4 illustrates an exemplary query execution process in accordance with disclosed embodiments.

During query execution, client system 402 sends the query, according to the metadata defined in the BM template, to data server 404.

Data server 404 constructs the query in the search server format from the user-provided input, including the metadata definition. This can help eliminate the need for the user to have knowledge about the search server internals. The data server 404 can add any appropriate query filters.

The data server 404 can send the query and any filters to the search server 418.

Search server 418 executes the query and constructs any appropriate facet information from the metadata definition to send back to the client 402. Search server 418 sends any results and any facet information back to the data server 404, which can then send it to the client 402.

These processes illustrate the tremendous value the auto-generation provides for the configuration, indexing, and search execution, among other advantages.

Figure 5:
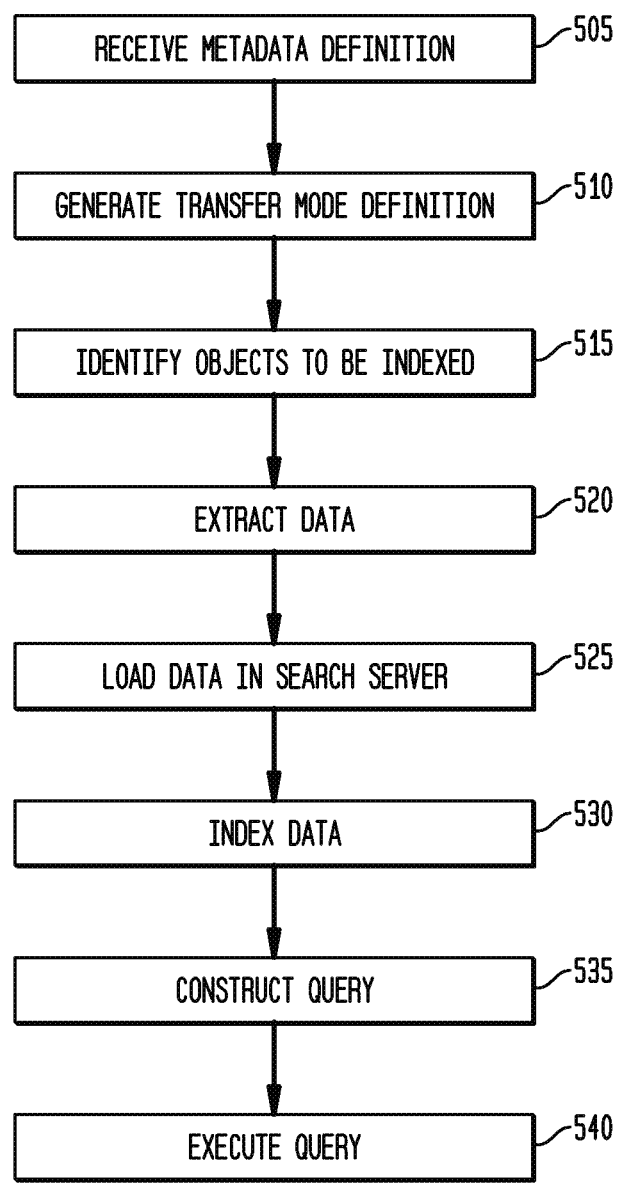
FIG. 5 illustrates a process in accordance with disclosed embodiments that can be performed by one or more data processing systems.

FIG. 5 illustrates a process in accordance with disclosed embodiments that can be performed by one or more data processing systems, referred to generically as the "system" below.

The system receives a metadata definition for search and indexing configuration (505). "Receiving," as used herein, can include loading from storage, receiving from another device or process, receiving via an interaction with a user, or otherwise. This step can include building a BM template according to the metadata definition.

The system generates a transfer mode definition to export objects for indexing (510). The transfer mode definition can include closure rules and property sets required to export data server business objects and their properties. This process can be performed by a BM based on a data model extracted from the BM template. The system can also generate other elements, such as the search server schema file, the XSLT file, and the XML schema described above.

The system identifies objects to be indexed according to the metadata definition (515). This process can include validating the objects and other data to be indexed before exporting them for indexing.

The system extracts data according to the transfer mode definition (520). This data can be application data required by the user, and can be extracted from a data server. This step can also include transforming the extracted data into an appropriate format for the search server using the XSLT file and search server schema file to produce a search-server-schema-compliant data file.

The system loads the extracted data into a search server (525).

The system indexes the extracted data (530). This process can be performed by a separate search server or by a search server application on the same system.

The system can construct a query according to the metadata definition, including adding query filters (535).

The system can execute a query according to the metadata definition (540).

To summarize, benefits, among others, of this single-point metadata driven "code-less" approach include a complete "end-to-end" solution using a single-point metadata driven "code-less" approach. Disclosed embodiments are less error-prone than previous approaches and promote configuration over customization. Techniques as disclosed herein provide faster availability of changes to indexing without having to wait for software updates, and the end user has control over what should be indexed, not the application developer.

This single-point metadata driven "code-less" automation of application search configuration and execution as disclosed herein offer a level of complete automation and configurability, among other advantages.

Disclosed embodiments can identify and configure what needs to be indexed for search purposes directly in the application without having to make changes to the original source code. In some embodiments, artifacts to generate search engine schema, configuration to export application data can be auto-generated directly from the data model metadata definition. Rule-based configurations can be made in a "code-less" manner.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for application search configuration, indexing and execution, the method performed by at least one data processing system and comprising:
   receiving a metadata definition for search and indexing configuration, wherein the metadata definition identifies objects and object properties;
   based at least in part on the same metadata definition, automatically generating all three of:
      a transfer mode definition to export objects for indexing,
      an Extensible Stylesheet Language Transformation (XSLT) file, and
      a search server schema file,
      wherein the transfer mode definition defines which objects to traverse, which proper-ties on the objects to traverse, which relations of the objects to traverse, the conditions under which the objects should be traversed, objects that should be only traversed, and objects that should be traversed and exported;
   identifying objects to be indexed according to the metadata definition including extracting data for the identified objects from a data server according to the transfer mode definition;
   transforming the extracted data for the identified objects into a search server format based at least in part on both the XSLT file and the server schema file that were both automatically generated by the at least one processor from the same metadata definition used by the at least one processor to generate the transfer mode definition that was used to extract the data for the identified objects;
   loading the extracted data in the search server format into a search server; and
   indexing the extracted data through operation of the search server.

2. The method of claim 1, further comprising executing a query according to the metadata definition.

3. The method of claim 2, wherein the query is constructed according to the metadata definition and query filters are added.

4. The method of claim 2, wherein executing the query includes constructing facet information from the metadata definition.

5. The method of claim 1, wherein the transfer mode definition includes closure rules and property sets required to export data server business objects and properties of the data server business objects.

6. The method of claim 1, wherein the search server schema file identifies properties for an index, identifies a definition source for properties, identifies properties on referenced objects for the index, and contains field definitions in a search server format for data server business objects and properties for the index.

7. The method of claim 1, wherein the system constructs a business modeler (BM) template according to the metadata definition.

8. The method of claim 1, wherein the at least one data processing system also validates the extracted data.

9. A hardware system for application search configuration, indexing and execution, comprising:
   at least one data processing system having a processor and an accessible memory, the at least one data processing system configured to
      receive a metadata definition for search and indexing configuration, wherein the metadata definition identifies objects and object properties;
      based at least in part on the same metadata definition, automatically generate all three of:
         a transfer mode definition to export objects for indexing,
         an Extensible Stylesheet Language Transformation (XSLT) file, and
         a search server schema file,
         wherein the transfer mode definition defines which objects to traverse, which properties on the objects to traverse, which relations of the objects to traverse, the conditions under which the objects should be traversed, objects that should be only traversed, and objects that should be traversed and exported;
      identify objects to be indexed according to the metadata definition, including extract data for the identified objects from a data server according to the transfer mode definition;
      transform the extracted data for the identified objects into a search server format based at least in part on both the XSLT file and the server schema file that were both automatically generated by the at least one processor from the same metadata definition used by the at least one processor to generate the transfer mode definition that is used to extract the data for the identified objects;
      load the extracted data in the search server format into a search server; and
      index the extracted data through operation of the search server.

10. The system of claim 9, wherein the at least one data processing system also executes a query according to the metadata definition.

11. The system of claim 10, wherein the query is constructed according to the metadata definition and query filters are added.

12. The system of claim 10, wherein executing the query includes constructing facet information from the metadata definition.

13. The system of claim 9, wherein the transfer mode definition includes closure rules and property sets required to export data server business objects and properties of the data server business objects.

14. The system of claim 9, wherein the search server schema file identifies properties for an index, identifies a definition source for properties, identifies properties on referenced objects for the index, and contains field definitions in a search server format for data server business objects and properties for the index.

15. The system of claim 9, wherein the system constructs a business modeler (BM) template according to the metadata definition.

16. The system of claim 9, wherein the at least one data processing system also validates the extracted data.

* * * * *